UNITED STATES PATENT OFFICE.

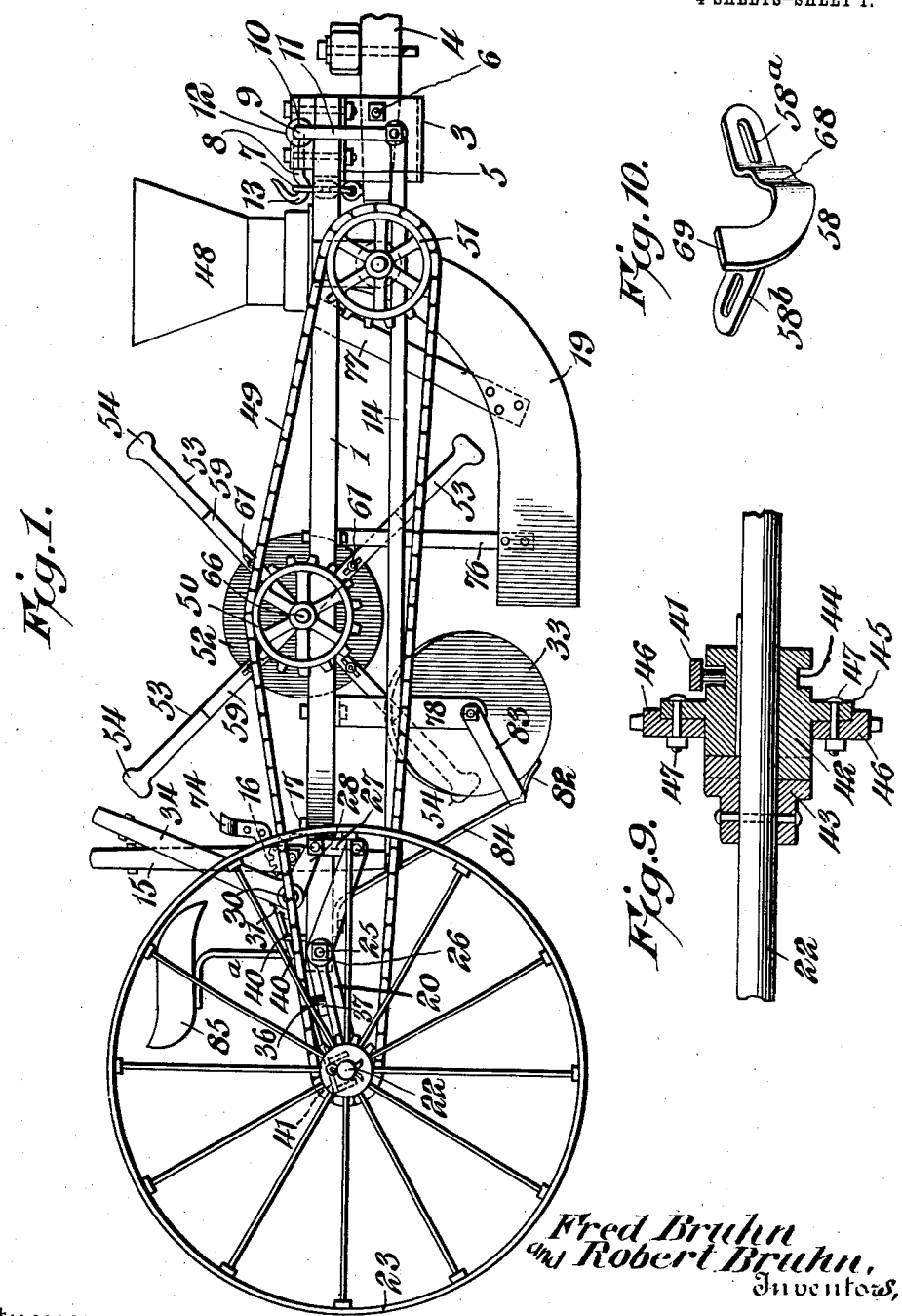

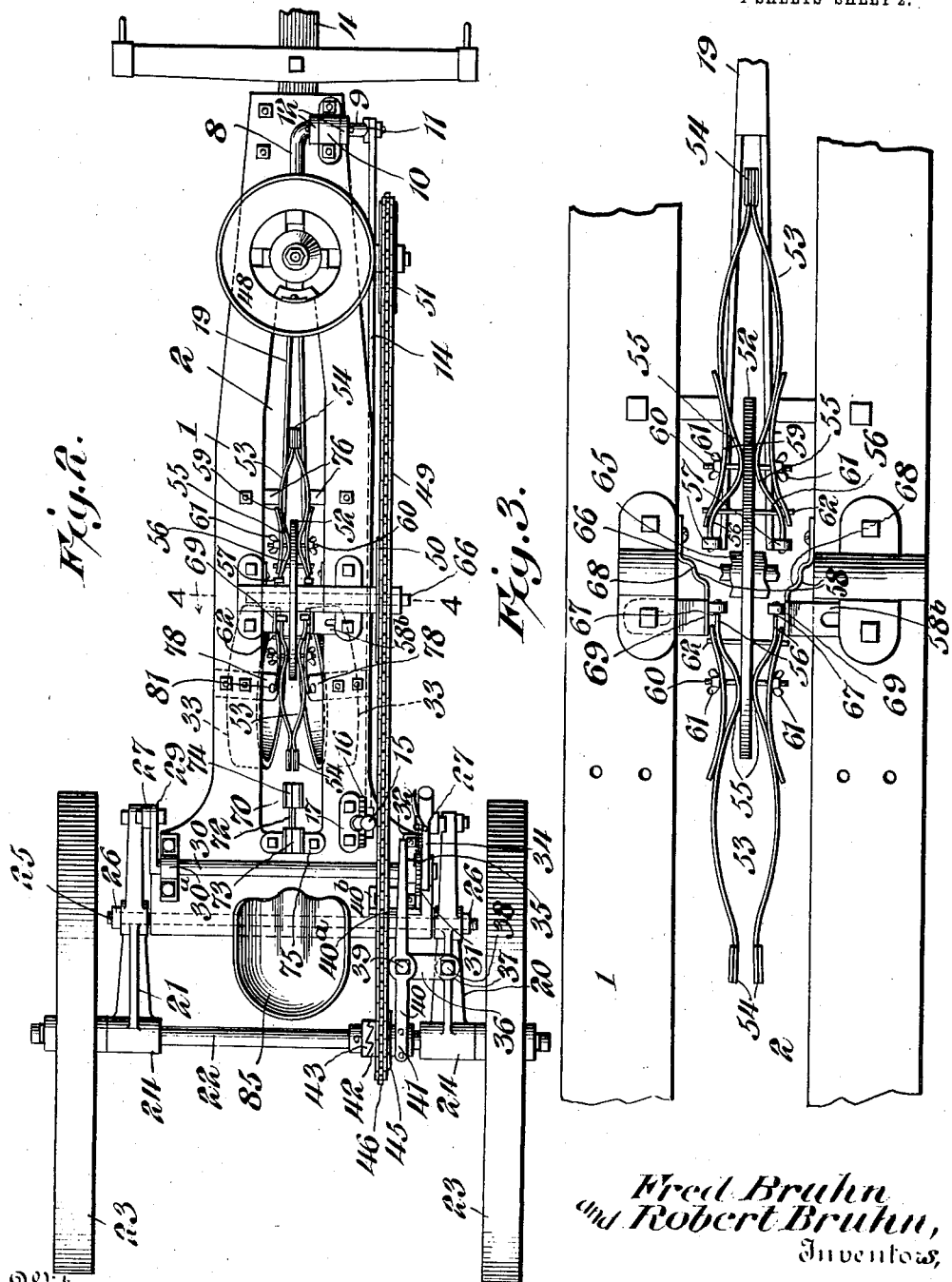

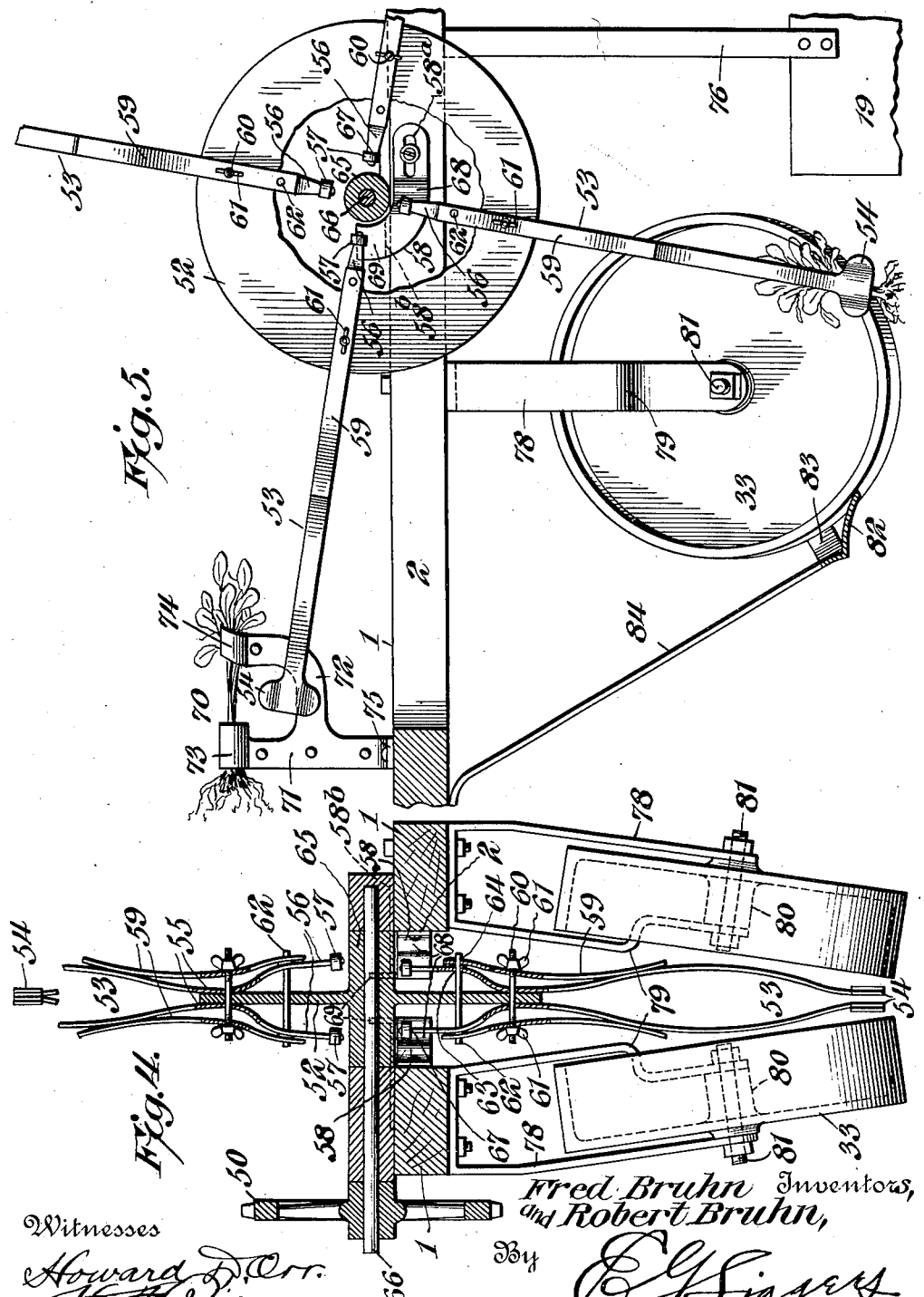

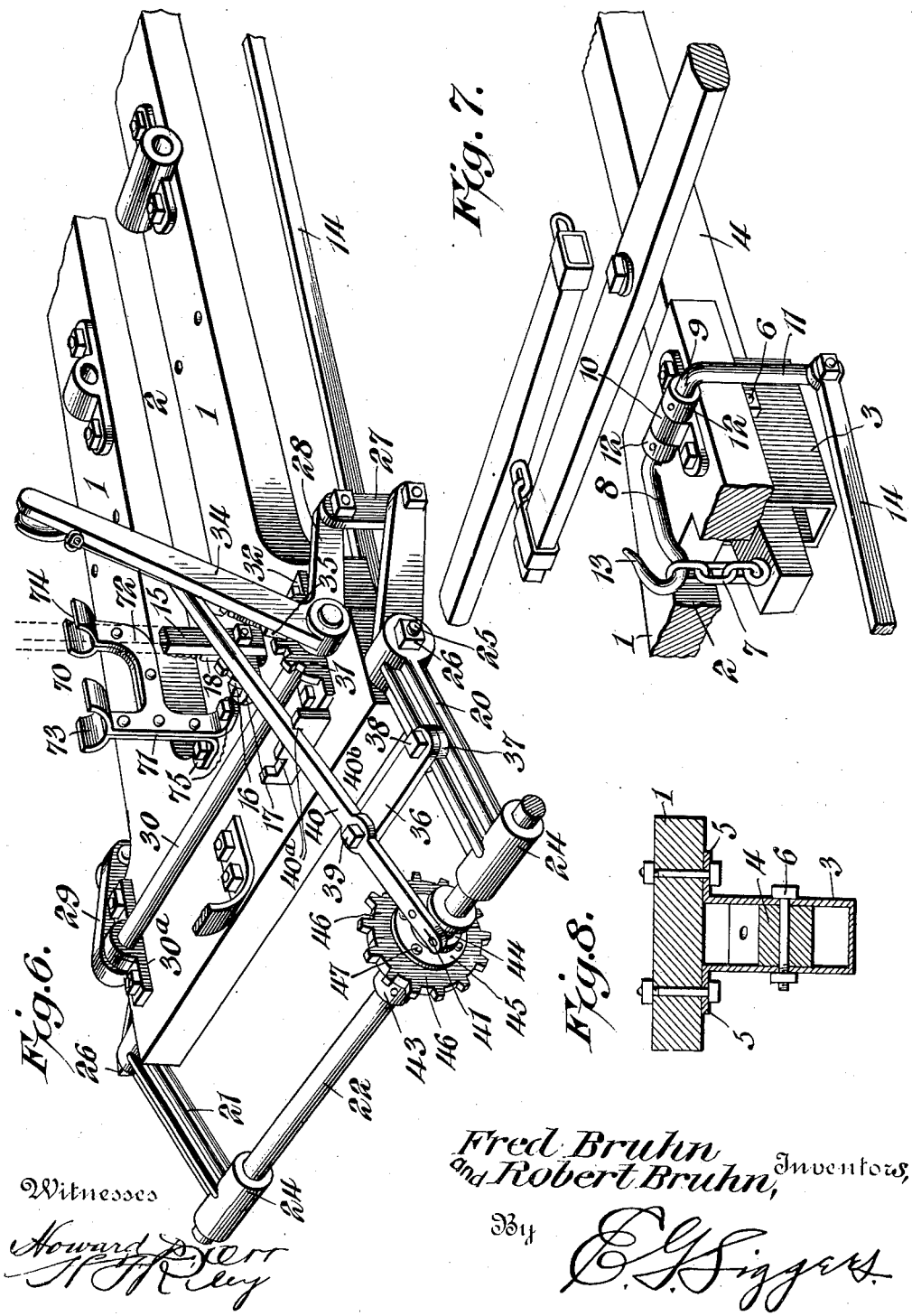

FRED BRUHN AND ROBERT BRUHN, OF VICKSBURG, MISSISSIPPI.

PLANT SETTING AND FERTILIZING MACHINE.

1,026,492.    Specification of Letters Patent.    Patented May 14, 1912.

Application filed May 24, 1910. Serial No. 563,173.

*To all whom it may concern:*

Be it known that we, FRED BRUHN and ROBERT BRUHN, citizens of the United States, residing at Vicksburg, in the county of Warren and State of Mississippi, have invented a new and useful Plant Setting and Fertilizing Machine, of which the following is a specification.

The invention relates to improvements in plant setting and fertilizing machines.

The object of the present invention is to improve the construction of plant setting and fertilizing machines, and to provide a simple, efficient and comparatively inexpensive machine, equipped with a rotary plant setter, adapted to take up plants from a fixed plant holder and capable of setting the plants at regular intervals in a furrow.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a plant setting and fertilizing machine, constructed in accordance with this invention. Fig. 2 is a plan view of the same. Fig. 3 is an enlarged plan view of a portion of the machine, illustrating the construction of the rotary plant setter. Fig. 4 is a transverse sectional view on the line 4—4 of Fig. 2. Fig. 5 is an enlarged longitudinal sectional view of the central portion of the machine, illustrating the arrangement of the rotary plant setter, the plant holder and the packing wheels. Fig. 6 is an enlarged perspective view of the rear portion of the machine, illustrating the manner of adjustably connecting the frame with the rear shaft or axle. Fig. 7 is an enlarged detail perspective view, illustrating the manner of adjustably connecting the front end of the frame with the tongue. Fig. 8 is a detail transverse sectional view, illustrating the manner of pivotally mounting the tongue. Fig. 9 is a detail sectional view, showing the clutch of the rear shaft or axle. Fig. 10 is a detail perspective view of one of the arcuate cams for actuating the plant carrying members.

Like numerals of reference designate corresponding parts in all the figures of the drawings.

In the embodiment of the invention illustrated in the accompanying drawings, 1 designates the frame of the machine, constructed of any suitable material and provided with a central longitudinal opening 2 for the reception of a rotary plant setter. The frame of the machine is provided at its front end with a depending yoke or casing 3, receiving the rear portion of the tongue 4 and composed of two vertical sides and a connecting bottom portion. The sides have their upper edges or portions bent outwardly to provide attaching flanges 5, which are bolted to the lower face of the front of the frame. The tongue is pivoted near its rear end in the yoke or casing 3 by a transverse bolt 6, and its rear end is adjustably connected by a short chain 7 with an arm 8 of a rock shaft 9. The rock shaft 9, which is journaled in suitable bearings 10 of the front of the frame, is provided with a depending arm 11, and it constitutes an angle lever for adjusting the frame with relation to the tongue, which is supported by the necks of the draft animals. The central transversely disposed pivot portion of the rock shaft is provided with collars 12, secured to the shaft by set screws, or other suitable fastening means and arranged at opposite sides of the bearing 10 for holding the shaft against longitudinal movement. The arm 8 extends rearwardly from the shaft, and its terminal is bent to form a hook 13 for adjustably engaging the chain. The depending arm 11 is connected by a rod 14 with the lower end of an upright adjusting lever 15, pivoted at an intermediate point to a toothed segment 16, having an attaching flange 17, secured to the rear portion of the frame 1 of the machine by bolts, or other suitable fastening means. The upright operating lever 15 is equipped with a spring actuated latch or detent 18, arranged to engage the toothed segment 16 and controlled by a latch operating lever of the ordinary construction, mounted on the operating lever adjacent to the handle or grip portion thereof. The lever 15 is operated for adjusting the frame to raise and lower a furrow opener 19 to carry the same into and out of the ground.

The rear end of the frame is connected by a pair of longitudinally disposed angle levers 20 and 21 with a rear shaft or axle 22, having suitable carrying wheels 23 fixed to its terminal portions, whereby the rear shaft or axle is rotated for operating the plant setter and the fertilizer distributer. The angle levers 20 and 21 are provided at their rear ends with bearing sleeves 24 for the reception of the rear axle, and they are enlarged at an intermediate point and are pivoted by a transverse rod 25, or other suitable means to the rear end of the frame at opposite sides thereof. The rod 25 extends through the rear end of the frame, and its terminals are threaded for the reception of nuts 26, which engage the enlarged intermediate portions of the angle levers 20 and 21. The rear arms of the angle levers 20 and 21 are preferably reinforced by longitudinal ribs or flanges, as shown, and their front arms, which extend downwardly at an obtuse angle to the rear arms, are connected by upwardly extending links 27 with arms 28 and 29 of a transverse rock shaft 30, extending across the rear end of the frame and journaled in a bearing 30ª at one side thereof and in a bearing opening of a toothed segment 31 at the opposite side of the frame. The toothed segment is provided with an attaching plate or portion 32, which is bolted or otherwise secured to the frame of the machine, as clearly shown in Fig. 6 of the drawings. The dual arrangement of the supporting levers for connecting the rear end of the frame with the axle 22 enables the frame to be readily raised and lowered to adjust a pair of packing wheels 33 to suit the character of the soil and to enable the desired pressure to be applied to the latter. The angle levers are simultaneously operated by means of an arm or lever 34, preferably formed integral with the arm 28 and constituting with the same an angle lever, which is secured in its adjustment by a spring actuated latch or detent 35, arranged to engage the toothed segment 31 and controlled by a latch lever, mounted on the arm 34 of the bell crank lever, adjacent to the handle or grip portion of the same.

The angle lever 20 also forms a support for a transversely disposed arm or bar 36, secured at its outer end on a seat 37 by a bolt 38, or other suitable fastening means, and provided at its inner end with a perforation for the reception of a pivot bolt 39, which fulcrums a clutch operating lever 40 on the arm 36. The seat 37 consists of a boss formed on the upper face of the rear arm of the lever 20 at a point intermediate of the ends of the said rear arm. The lever 40, which is disposed longitudinally of the machine, is fulcrumed at an intermediate point and its rear arm is connected by a yoke 41 with a slidable clutch member 42 and is adapted to move the latter into and out of engagement with a clutch member 43 fast on the shaft or axle. The front arm of the lever 40 is adapted to engage notches 40ª of a plate 40ᵇ, mounted on the frame for holding the lever 40 in either of its positions. The lever is adapted to be readily sprung into and out of engagement with the notches 40ª of the plate 40ᵇ. The clutch members are provided with coöperating engaging faces, which are preferably toothed, as clearly shown in Fig. 2 of the drawings, and the slidable clutch member, which has an annular groove 44 to receive the yoke 41, is also provided with an annular flange 45, located at an intermediate point between its ends and forming an attaching portion for the reception of a sectional sprocket wheel 46. The sectional sprocket wheel 46 is preferably composed of two halves secured by bolts 47, or other suitable fastening means to the attaching flange 45. This construction enables sprocket wheels of different diameters to be applied to the rear shaft or axle for varying the speed of the rotary plant setter and the operation of the fertilizer distributer. This will enable the distance between the plants to be varied.

Motion is communicated to the rotary plant setter, and to a fertilizer distributer 48 by a sprocket chain 49, extending longitudinally of the machine at one side thereof and having an upper flight passing over and meshing with a sprocket wheel 50 of the plant setter, and the sprocket chain also passes around a sprocket wheel 51 of the fertilizer distributer. By this arrangement the plant setter and the fertilizer distributer are simultaneously operated for depositing fertilizer in a ditch or furrow made by the furrow opener 19 and for setting plants in the said ditch or furrow. As the fertilizer distributer forms the subject-matter of Patent No. 997,367 granted to us July 11, 1911, the specific construction thereof is neither shown, nor described, nor claimed in the present application.

The rotary plant setter is composed of a central disk or support 52, and a plurality of sets of radially disposed plant carrying members 53, arranged in pairs at intervals around the central support, and provided at their outer ends with plant engaging jaws 54 and fulcrumed at an intermediate point to form inner and outer arms. The outer arms are oppositely bowed or curved longitudinally and have inner concave faces and outer convex faces. The intermediate portions 55 of the opposite plant carrying members are reversely curved or bowed and present convex faces to the side faces of the central disk to form fulcrums for the said members. The inner arms 56 diverge from the intermediate portions and are equipped with anti-friction devices, preferably consisting of rollers 57, adapted to be operated by arcuate cams 58, arranged in the path of the inner arms of the plant carrying members and adapted to open the same and maintain them in an open condition during a portion of the rotary movement of the plant setter. The plant carrying members are normally maintained in a closed position by means of a pair of springs 59, extending longitudinally of the intermediate portions of the members and bearing against the inner and outer arms thereof and connected by an adjusting device, consisting of a rod 60, piercing the springs, the intermediate portions of the plant carrying members and the disk and having terminal threaded portions for the reception of thumb nuts 61, which are adapted to be adjusted for regulating the tension of the springs. The inner arms 56 of the plant carrying members are guided by a transverse rod 62, mounted in an opening of the disk or support 52 and extending from opposite sides thereof and having its terminal portions extending through apertures 63 and 64 of the inner arms of the plant carrying members and the inner ends of the side springs. The clamp engaging jaws, which preferably consist of integral enlargements of the outer ends of the plant carrying members, are slightly curved or bowed to present inner concave faces to a plant. The jaws 54 engage a plant between the roots and the leaves, and the bowing of the outer portions of the plant carrying members 53 provides a space for the leaves, the roots being located beyond the jaws 54, as clearly illustrated in Fig. 5 of the drawings.

The central support or disk 52 is provided with an integral hub portion 65, fixed to an intermediate transverse shaft 66 and extending across the opening 2 between the sides of the frame. The transverse shaft is journaled in opposite bearings, mounted on the frame at opposite sides thereof, and it is extended at one end to receive the intermediate sprocket wheel 50. The inner terminals 67 of the plant carrying members are reduced to form pivots or spindles for the anti-friction rollers, and the arcuate cams, which consist of plates, are arranged in the space between the sides of the main frame. These cams extend rearwardly beneath the hub of the plant setter and upwardly in rear of the same, as clearly shown in Fig. 5. The intermediate portions 68 are bent transversely and converge rearwardly to engage the rollers and open the jaws of the plant carrying members for releasing the plants when the plant carrying arms arrive at the bottom of the plant setter and are in position for placing a plant in the furrow. The upwardly curved rear terminal portions 69 of the opposite cams maintain the jaws of the plant carrying arms in an open position until they reach a plant holder 70 and are in position for engaging a plant. The rollers leave the cams when the jaws are in position for grasping a plant, and the springs operate to close the jaws on the plant, which is carried upwardly and forwardly by the plant setter and then downwardly and rearwardly to the furrow. The plant setter is preferably equipped with four sets of plant carrying members, but any other desired number may be employed, as will be readily understood. The front end of the cam or cam-shaped plate constitutes an attaching portion and is provided with a longitudinal slot 58$^a$ for the reception of a bolt, or other suitable fastening device for securing the cam to the frame of the machine, and the said cam is provided at its rear upwardly extending portion with a laterally extending attaching arm 58$^b$, which is suitably secured to the upper face of the frame. The front longitudinal attaching arms, which are arranged in vertical planes, fit against the inner longitudinal edges of the side members of the frame, and the transverse attaching arms are arranged in a horizontal plane and are fitted against the upper faces of the side members of the frame of the machine. The longitudinal and transversely disposed slots of the said arms permit a longitudinal and lateral adjustment of the cams.

The plant holder 70 is forked being composed of a rear upright standard or portion 71, and an L-shaped arm 72 connected with the upright portion at a point intermediate of the ends thereof and consisting of a rear horizontal portion and a front vertical portion, arranged in spaced relation with the upper half of the vertical portion or standard 71. The upper end of the standard and the vertical portion of the L-shaped arm 72 are provided with alined approximately semi-circular plant-receiving seats 73 and 74, adapted to support a plant in a horizontal position, as clearly shown in Fig. 5 of the drawings. The plant holder, as clearly illustrated in Fig. 6 of the drawings, is composed of two plates or members riveted together and having laterally projecting attaching portions 75 at the lower end of the post or standard, but the forked holder may be constructed in any other desired manner, as will be readily understood. The plants are placed in the holder by hand and are automatically lifted therefrom by the plant setter and conveyed to and placed in the furrow formed by the furrow opener 19.

The furrow opener is composed of two sides or members connected with the sides of the frame by braces 76 and with the fertilizer distributer by means of an inclined spout or tube 77, secured between the sides or members of the furrow opener. The dropping of the fertilizer is timed to correspond with the position of the plant carrying arms. The fertilizer is dropped into the furrow before the plant reaches the same, and as the machine advances, the plant carrying arm moves rearwardly and maintains the plant over the fertilizer until it is deposited on the same.

The furrow is closed by the packing wheels 33, set at an angle, as clearly shown in Fig. 4 of the drawings, and mounted in standards 78. The packing wheels 33 are inclined downwardly and rearwardly and their peripheries are arranged to pack and hill the soil, the pressure being regulated by the means heretofore described. The standards 78, which are inclined downwardly and inwardly, are approximately U-shaped, being composed of two sides and a connecting top portion, which is bolted, or otherwise secured to the lower faces of the sides of the frame. The inner side of the standard is angularly bent at 79 to arrange the lower portion within the plane of the rim or periphery of the packing wheel, which is provided with an inwardly extending hub 80, receiving a shaft or spindle 81, which pierces the lower ends of the sides of the standards 78, being provided with threaded terminals for the reception of the nuts, as shown. The hubs 80 extend from the inner faces of the webs or plates, which are connected with the rims or peripheries of the outer edges thereof.

A scraper 82 is arranged at the back of each of the packing wheels, and it is supported by a forwardly inclined arm 83 and a rear inclined brace 84. The arm 83 extends upwardly and forwardly to the shaft or axle of the packing wheel, and the brace extends upwardly and rearwardly to the frame, and is secured to the lower face of the same. The scrapers remove the soil from the peripheries of the packing wheels.

The machine is equipped with a seat 85 for the accommodation of the driver or operator, and the levers for throwing the machine into and out of operation and for raising and lowering the frame are within easy reach of the person occupying the seat.

Having thus fully described our invention, what we claim as new and desire to secure by Letters Patent, is:—

1. A machine of the class described including a plant setter comprising a pair of plant carrying members fulcrumed at an intermediate point to form inner and outer arms, exterior springs extending longitudinally of the said members and engaging the same to hold the outer arms normally closed, means for adjustably connecting the springs for varying the tension of the same, and means located in the path of the inner arms and adapted to actuate the same to open the outer arms.

2. A machine of the class described including a plant setter comprising a pair of plant carrying members bowed at an intermediate point to form fulcruming portions, exterior longitudinal springs extending across the said bowed portions and engaging the plant carrying members for holding the outer arms normally closed, a transversely disposed adjusting device connecting the springs for varying the tension thereof, and means arranged in the path of the inner arms and adapted to engage the same for opening the outer arms of the said members.

3. A machine of the class described including a plant setter comprising a pair of plant carrying members bowed at an intermediate point to form fulcruming portions and provided with inner and outer arms, exterior longitudinal springs extending across the bowed portions of the members and arranged to hold the outer arms normally closed, a rod piercing the springs and the arms and having threaded portions, nuts mounted on the threaded portions of the rod and engaging the springs, and means for engaging the inner arms and adapted to engage the same for opening the outer arms.

4. A machine of the class described including a plant setter comprising a pair of plant carrying members inwardly bowed at an intermediate point to form fulcruming portions and provided with inner and outer arms, exterior longitudinal springs extending across the said bowed portions of the members and engaging the same to hold the outer arms normally closed, a rod piercing the springs and the bowed portions of the members and having threaded terminals, nuts arranged on the threaded portions of the rod and engaging the spring, and a guide rod extending through the inner ends of the springs and the inner arms of the members.

5. A machine of the class described including a plant setter comprising a central support, radially disposed plant carrying members arranged in pairs and bent at an intermediate point to form fulcruming portions and to provide inner and outer arms, said fulcruming portions being fitted against the said support, exterior springs engaging the members for holding the outer arms normally closed, adjusting means connected with the springs for varying the tension thereof, and guiding means carried by the central support for the springs and the said members, and means for opening the said members.

6. A machine of the class described including a rotary plant setter comprising a central disk having a hub, radially disposed plant carrying members arranged in pairs and having inner and outer arms, said members being bent at an intermediate point to form fulcruming portions, exterior springs engaging the members for holding the outer arms normally closed, adjusting devices piercing the disk, the members and the springs and having means for engaging the latter, and transversely disposed guide rods mounted on the disk and extending through the inner ends of the springs and the inner arms of the plant carrying members.

7. A machine of the class described including a rotary plant setter provided with spring actuated plant carrying members fulcrumed at an intermediate point to form inner and outer arms, a fixed plant holder co-operating with the plant setter, cams located in the path of the inner arms of the said members and consisting of arcuate plates provided with front forwardly extending longitudinally disposed attaching arms and diverging rearwardly therefrom to open the said members and extending upwardly at their rear portions to maintain the members in an open position, said rear portions having transversely disposed attaching arms, and means for securing the longitudinal and transverse attaching arms to the machine.

8. A machine of the class described including a rotary plant setter provided with spring actuated plant carrying members fulcrumed at an intermediate point to form inner and outer arms, a plant holder located in rear of the plant setter, arcuate cams arranged in the path of the inner arms of the said members for opening the same when they arrive at the bottom of the plant setter and having upwardly extending rear portions to maintain the members in an open position until they arrive at the plant holder, longitudinally disposed attaching arms extending forwardly from the front ends of the cams and arranged in vertical planes and provided with slots, transversely disposed attaching arms extending from the rear portions of the cams and arranged in a horizontal plane and provided with slots, and fastening devices operating in the slots of the longitudinal and transverse attaching arms and adjustably securing the cams to the machine.

In testimony that we claim the foregoing as our own, we have hereto affixed our signatures in the presence of two witnesses.

FRED BRUHN.
ROBERT BRUHN.

Witnesses:
  W. H. DUPRÉ,
  J. E. GALLAGHER.